United States Patent
Mliner

[11] 3,755,953
[45] Sept. 4, 1973

[54] DEEP SET FLOAT
[76] Inventor: Gilbert Mliner, 8474 S. Burrell St., Oak Creek, Wis. 53154
[22] Filed: July 28, 1971
[21] Appl. No.: 166,859

[52] U.S. Cl. ............................................... 43/43.11
[51] Int. Cl. ............................................ A01k 93/00
[58] Field of Search ...................... 43/43.11, 44.87

[56] References Cited
UNITED STATES PATENTS

| | | | |
|---|---|---|---|
| 2,728,161 | 12/1955 | Mangel et al. | 43/43.11 |
| 2,795,077 | 6/1957 | John | 43/43.11 |
| 3,464,141 | 9/1969 | Amlin | 43/43.11 |
| 2,531,940 | 11/1950 | Kirschman | 43/43.11 |
| 3,340,644 | 9/1967 | Lintz | 43/43.11 |
| 3,441,962 | 5/1969 | Williams | 43/43.11 X |

Primary Examiner—Robert Peshock
Assistant Examiner—James H. Czerwonky
Attorney—James E. Nilles

[57] ABSTRACT

An automatic fishing line depth control device comprising a float having a rectangular passage through the center, a pair of bearings mounted at each end of the passage in recesses to allow for free rotation of the float with respect to the bearings. A threaded shaft is secured to the bearings and positioned within the rectangular passage and a rectangular nut having an outer configuration conforming to the shape of the passage is mounted for movement on the threaded shaft. Line guide hangers are secured to the bearings and have a pair of guide loops aligned in a transverse relation to the passage. A track is formed in the outer periphery of the float transverse to the passage and aligned with the guide loops, and a fishing line has a number of turns wrapped around the track with the ends of the line passing through guide loops in the hangers. The number of rotations of the float with respect to the bearings necessary to move the nut into abutting engagement with one of the bearings will determine the depth of line which will be released by the device as the float comes to rest in the water. The float has indicia means to indicate the length of line relative to the position of the nut.

1 Claim, 9 Drawing Figures

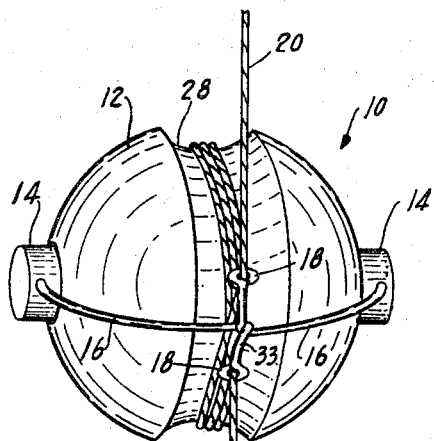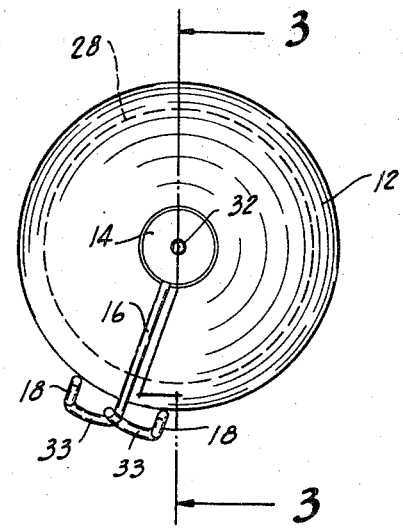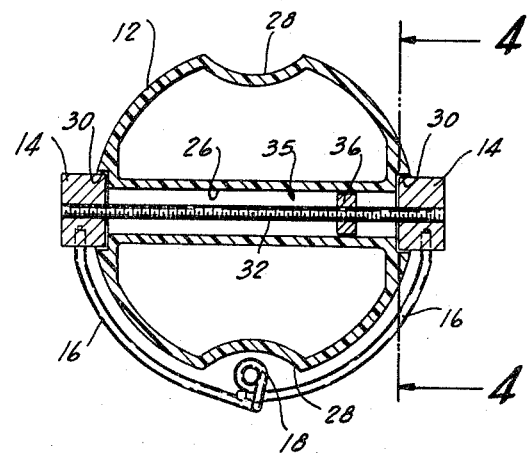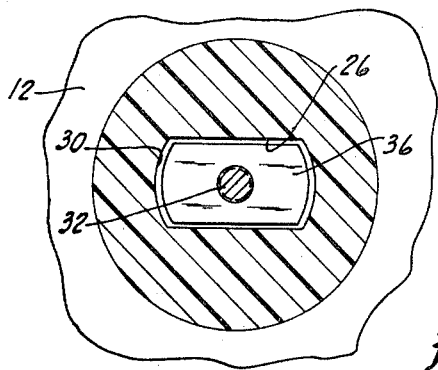

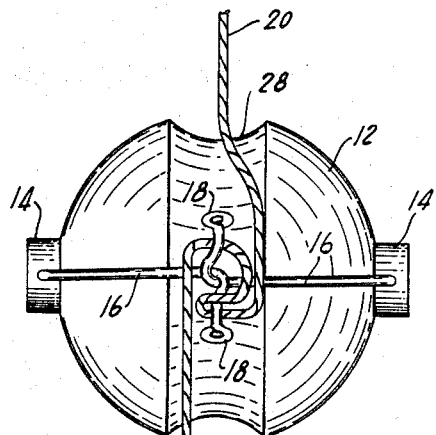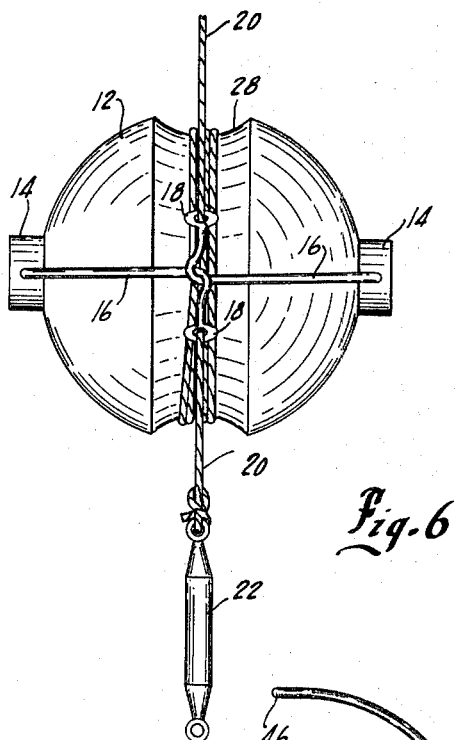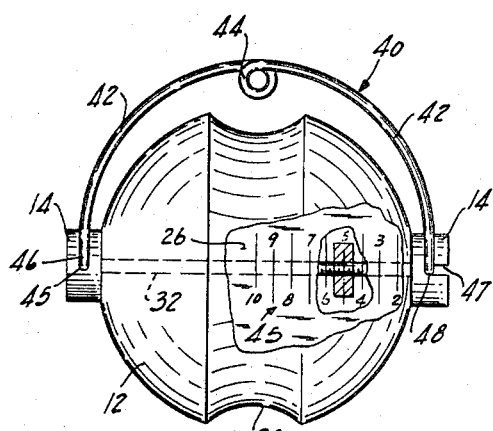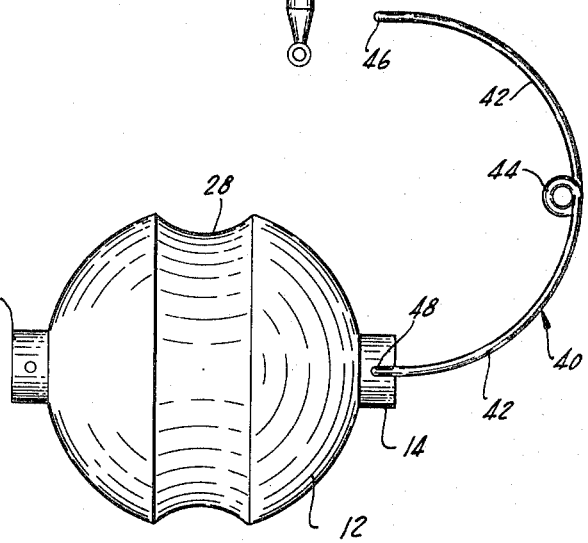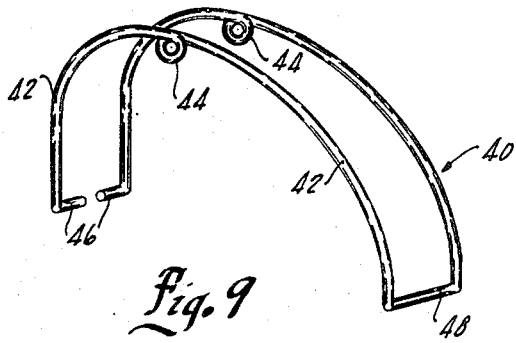

DEEP SET FLOAT

RELATED APPLICATIONS

This application is based on my Disclosure Document No. 002887 which was filed in the Patent Office on Sept. 2, 1970.

BACKGROUND OF THE INVENTION

Casting a fishing line on which a float has been attached is a difficult task as any fisherman knows. The length of line which can be cast with the float is limited to a great extent to the capability of the person handling the casting rod. Efforts to provide a float which will release a predetermined length of line after the float is cast into the water of the type shown in the Salfer Pat. No. 3,425,151, involve a complicated arrangement for releasing the line from the float after it hits the water. This type of arrangement is not automatically resettable as the line is drawn back into the casing rod and has to be reset prior to each cast. Other devices utilize knots, loops or guides on the line which must be wound on the reel. This line is allowed to slide through the float until the knot or loop engages the float to limit the length of line which descends from the float. However, all of these devices must be made so that the knot or line will not interfere with the operation of the reel.

SUMMARY OF THE INVENTION

The automatic fishing line depth control device of the present invention provides for the casting of the float, sinker, and hook as a unit. After the float lands on the water, the line is free to drop to the preset depth automatically. The device is automatically reset to the same depth on retrieval. The float includes a simple arrangement for setting depth and utilizes the relation of the circumference of the float to the pitch of the screw thread to determine the length of line. A visual observation of the nut or an indicia provided on the float can be used to indicate the depth to which the line has been set. This device can be quickly and easily set and after once setting, can be reused any number of times without resetting of the float.

Other objects and advantages will become apparent from the following description when read in connection with the accompanying drawings.

THE DRAWINGS

FIG. 1 is a perspective view of the automatic fishing line depth control assembly of this invention.

FIG. 2 is a side view in elevation of the assembly;

FIG. 3 is a cross sectional view taken on line 3—3 of FIG. 2 showing the depth control assembly;

FIG. 4 is a view taken on line 4—4 of FIG. 3 showing the mechanical engagement between the float and the depth control assembly;

FIG. 5 is a view of the hanger showing the method of wrapping the line around the guide loops;

FIG. 6 is a view similar to FIG. 5 showing the float device ready for use;

FIG. 7 is an alternate embodiment showing a float device having a single wire hanger;

FIG. 8 is a side view in elevation of the embodiment shown in FIG. 7 with the hanger in the open position; and FIG. 9 is a perspective view of the modified hanger shown in FIG. 7.

DESCRIPTION OF THE INVENTION

The fishing line depth control device 10 of the present invention as seen in FIG. 1 generally includes a float 12 mounted for rotary motion on a pair of bearings 14. A hanger 16 is secured to each of the bearings 14 and extends around the outer periphery of the float 12 in a spaced relation thereto, each hanger 16 includes a pair of guide loops 18. The fishing line 20, including sinker 22 and hook 24 is wrapped around the float 12 a number of times, with each end of the line passing through one of the guide loops 18. The sinker 22 should be located in close proximity to the guide loop 18.

In operation, the float 12, sinker 22 and hook 24 are cast as a unit. After the device lands on the water, the weight of the sinker 22 and hook 24 will pull the line 20 through the guide loops 18 rotating the float 12 with respect to the bearings 14. Rotation of the float 12 will pull line 20 from the casting rod allowing the sinker 22 and hook 24 to descend freely into the water. As described more clearly hereinafter, the float is allowed to rotate freely until the bait reaches the required depth. The rotary motion of the float 12 is then stopped by means of the depth control assembly 35.

In accordance with the invention the float 12 is formed from a plastic material which can be clear plastic if desired and includes a central rectangular passage 26 through the center of the float 12 and track 28 in the form of a groove or recess in the outer periphery of the of the float 12. The track 28 is located in a transverse relation to the passage 26. A small recess or annular groove 30 is provided at each end of the passage 26. The float 12 is of sufficient size to provide the buoyancy necessary to support the sinker 22, hook 24 and bait in the water.

Means are provided for allowing the float 12 to rotate as the fishing line 20 descends into the water. Such means is in the form of the bearings 14 which are mounted on each end of a threaded shaft 32 located within the passage 26. The bearings 14 are seated in the recesses or depressions 30 located at the ends of the passage 26. The bearings 14 should not be drawn up tight in the depressions, as the float must rotate freely with respect to the bearings in order to accomplish the desired control of the depth of the fishing line 20.

Means are provided on the bearings 14 for guiding the fishing line onto and off of the float 12. Such means is in the form of a pair of wire hangers 16, each having one end embedded in and secured to the bearings 14. The other end of each of the hangers 16 includes a guide loop 18 which is formed by bending the end 33 of the wire hanger at a right angle to the body of the hanger 16. The guide loops 18 are formed on the end of the ends 33 of the wire hanger 16. Each end of the hangers are interlocked with each other as seen in FIGS. 1 and 5 with the guide loops 18 aligned with the track 28. As more particularly described hereinafter, the fishing line 20 is wrapped around the float 12 and passes through the guide loops 18.

The fishing line 20 is retained on the surface of float 12 by means of the track 28. The track 28 is shown in the form of a recess or depression however it should be understood that the track 28 can also be formed by radially extending flanges provided on the outer periphery of the float 12.

The depth or length of line 20 which is allowed to drop from the float 12 is controlled by means of the control assembly 35. This assembly includes a nut 36 threadedly mounted on the threaded shaft 32. The outer surface or contour of the nut 36 generally conforms to the rectangular configuration of the passage 26 so that the nut 36 follows the rotary motion of the float 12 as the float rotates with respect to the bearings 14. It should be apparent that the float device 10 is set by merely rotating the float 12 to move the nut 36 away from one of the bearings 14. Each rotation of the float 12 indicates a certain amount or length of line equal to the circumference of float 12. Therefore, the number of rotations which are required to move the nut 13 back into engagement with the same bearing times the circumference will determine the length of line that will be dropped from the float. For example, a 2 inch diameter float having a circumference of 6.28 inches will drop 125.6 inches of line in 20 revolutions.

Means can be provided indicating the length of line that will be dropped from the float 12. Such means can be in the form of a visual observation of the nut 36 by making the float of a transparent plastic. An indicia 45 can be provided in the passage of the float 12 to show the length of line in relation to the position of the nut 36 as seen in FIG. 7.

In operation, the fisherman holds the bearings 14 between his thumb and forefinger and rotates the float 12 to move the nut to the indicated depth position on the indicia provided on the float. Once the depth has been set, the line is looped around the guide loops 18 as shown in FIG. 5. The line is then drawn taut and it should be apparent that the loops of the line 20 will pass between the hangers 16 where they are intertwined. The line can then be wrapped around the float 12 once and the process repeated a number of times until there are a number of loops of line around the float as seen in FIG. 6. The line 20 is then positioned in the guide loops 18, with the sinker 22 in a close proximity to one of the guide loops 18. When the float 12 is cast, the sinker 22 and hook 24 will pull the line 12 through the guide loop 18, rotating the float 12 with respect to the bearings 14. As the float 12 rotates, the fishing line will be simultaneously drawn from th casting rod through one of the loops 18 and wrapped around the float 12. At the same time the line is being unwrapped from the float through the other guide loop 18. The number of loops which are wrapped around the float should be sufficient to assure that the float will rotate as the line is unwrapped from the float 12.

In the alternate embodiment of the invention, shown in FIGS. 7, 8, and 9, a modified form of guide loop hanger 40 is shown for guiding the line on the float. This guide loop hanger 40 is formed from a single piece of wire 42 having guide loops 44 at the center. The ends 46 of the wire 42 are split for mounting in one of the bearings 14. The closed end 48 of the hanger 40 is positioned within a groove 47 in one of the bearings 14. The split ends 46 are positioned within opening 45 provided in the other bearing 14. When the line 20 is to be mounted on the float 12, the split ends 46 are opened up to release the hanger 40 from one of the bearings 14. The hanger assembly 40 is pivoted to the position shown in FIG. 8. The line is wrapped around the float and each end of the line 20 is then positioned in one of the guide loops 44. The hange assembly is then reassembled by inserting the split ends 46 of the hanger into the openings 45 in the bearing 44.

I claim:

1. A float device for automatically releasing a preset length of fishing line after the device has been cast into the water, said device comprising
    a hollow float having an axial passage, said float having a circlar recess at each end of said passage,
    a threaded shaft in said passage,
    a bearing mounted on each end of said shaft and positioned in one of said recess at the respective ends of said passage for supporting said float for rotary motion, each of said recesses being larger than the respective bearings positioned therein,
    a hanger secured to each of said bearings, each hanger including a guide loop for holding a fishing line which has been wrapped around the float, and
    a nut mounted on said shaft for limiting the number of revolutions of said float with respect to said bearings to control the depth of the fishing line, said float also having indicia means to indicate the length of line relative to the position of the nut.

* * * * *